US009528538B2

(12) United States Patent
Naoi et al.

(10) Patent No.: US 9,528,538 B2
(45) Date of Patent: Dec. 27, 2016

(54) CLIP

(71) Applicants: NIFCO INC., Yokosuka-shi, Kanagawa (JP); HONDA MOTOR CO., LTD., Minato-ku, Tokyo (JP)

(72) Inventors: Hajime Naoi, Yokosuka (JP); Yusuke Inoue, Wako (JP)

(73) Assignees: NIFCO INC., Yokosuka-Shi, Kanagawa (JP); HONDA MOTOR CO., LTD., Tokyo (JP)

(*) Notice: Subject to any disclaimer, the term of this patent is extended or adjusted under 35 U.S.C. 154(b) by 19 days.

(21) Appl. No.: 14/431,631

(22) PCT Filed: Sep. 20, 2013

(86) PCT No.: PCT/JP2013/005562
§ 371 (c)(1),
(2) Date: Mar. 26, 2015

(87) PCT Pub. No.: WO2014/050047
PCT Pub. Date: Apr. 3, 2014

(65) Prior Publication Data
US 2015/0252829 A1    Sep. 10, 2015

(30) Foreign Application Priority Data
Sep. 28, 2012  (JP) ................ 2012-217456

(51) Int. Cl.
*F16B 5/06* (2006.01)
*F16B 5/07* (2006.01)
*F16B 21/12* (2006.01)

(52) U.S. Cl.
CPC .......... *F16B 5/0642* (2013.01); *F16B 5/0657* (2013.01); *F16B 5/07* (2013.01); *F16B 21/12* (2013.01);
(Continued)

(58) Field of Classification Search
CPC ... F16B 5/0642; F16B 5/07; F16B 2005/0671; F16B 5/0657; F16B 21/12; Y10T 24/45089; Y10T 24/309; Y10T 24/42; Y10T 24/44026; Y10T 24/45105; Y10T 24/4501; Y10T 24/45094; Y10T 24/45005
USPC ........................................................ 411/553
See application file for complete search history.

(56) References Cited

U.S. PATENT DOCUMENTS 1,021,185 A    3/1912   Foster
2,870,667 A    1/1959   Murtaugh
(Continued)

FOREIGN PATENT DOCUMENTS

CN    1295653 A    5/2001
JP    S52-8747     1/1977
(Continued)

OTHER PUBLICATIONS

Europe Patent Office, "Search Report for European Patent Application No. 13841436.2," Apr. 13, 2016.
(Continued)

Primary Examiner — Robert J Sandy
Assistant Examiner — Michael Lee
(74) Attorney, Agent, or Firm — Manabu Kanesaka

(57) ABSTRACT

A clip couples a first member with a first through-hole, and a second member with a second through-hole. The clip includes a flexible cylindrical portion having a predetermined center axis line, opening two ends, and formed so that a distance from the center axis line to an outside surface is different in a rotational direction around the center axis line. The center axis line is orthogonal to an axis line of the coupling hole, and the cylindrical portion is inserted into a coupling hole rotatably between a first rotational position and a second rotational position around the center axis line. The cylindrical portion is set to have a distance between the center axis line and the outside surface to be loosely fitted in the coupling hole at the first rotational position and to be clamped between hole walls of the coupling hole at the second rotational position.

10 Claims, 19 Drawing Sheets

(52) U.S. Cl.
CPC ....... *F16B 2005/0671* (2013.01); *Y10T 24/309* (2015.01); *Y10T 24/44026* (2015.01); *Y10T 24/4501* (2015.01); *Y10T 24/45089* (2015.01); *Y10T 24/45105* (2015.01)

(56) References Cited

U.S. PATENT DOCUMENTS

| | | |
|---|---|---|
| 5,897,278 A | 4/1999 | Frattarola |
| 2012/0227219 A1 | 9/2012 | Kabeya et al. |
| 2013/0199001 A1 | 8/2013 | Jagoda |
| 2013/0283575 A1* | 10/2013 | Tanabe ............... F16B 2/20 24/453 |

FOREIGN PATENT DOCUMENTS

| | | |
|---|---|---|
| JP | S62-152836 U | 9/1987 |
| JP | H04-117907 U | 10/1992 |
| JP | H11-169151 A | 6/1999 |

OTHER PUBLICATIONS

China Patent Office, "Office Action for Chinese Patent Application No. 201380050274.5," Nov. 3, 2015.
PCT, "International Search Report for PCT/JP2013/005562".

* cited by examiner

CLIP

RELATED APPLICATIONS

The present application is National Phase of International Application No. PCT/JP2013/005562 filed Sep. 20, 2013, and claims priority from Japanese Application No. 2012-217456, filed Sep. 28, 2012, the disclosure of which is hereby incorporated by reference herein in its entirety.

FIELD OF TECHNOLOGY

The present invention relates to a clip fastening a plurality of members wherein through-holes are formed. For example, the clip is used for coupling cowl (fairing) members of a motorcycle and the like.

BACKGROUND ART

There is a coupling structure forming a through-hole in a plate-like member, inserting a clip having an axis portion into the through-hole, and rotating the clip around an axis line so as to couple the clip to a plate-like member. The clip includes a head portion serving for a gripper protruding outward in a radial direction from a base end of the axis portion; and a locking convex portion protruding outward in the radial direction from a tip of the axis portion. The through-hole includes a circular hole portion through which the axis portion can pass; and a concave groove concaved outward in the radial direction from a peripheral edge of the circular hole portion, and through which the locking convex portion can pass. After the locking convex portion passes through the concave groove, the axis portion rotates around the axis line, so that the locking convex portion is biased from the concave groove, and a peripheral edge portion of the circular hole portion is held between the head portion and the locking convex portion, so that the clip passes through the through-hole to be retained. There is a clip wherein while using such a coupling structure, different plate-like members are mutually laminated, the through-hole and the concave groove, that become coaxial, are respectively provided at portions facing each other so as to be integrally fastened by the clip (for example, Patent Document 1).

PRIOR ART DOCUMENT

Patent Document

Patent Document 1: Japanese Patent Application Publication No. S52-8747

SUMMARY OF THE INVENTION

Problems to be Solved by the Invention

In the aforementioned clip, in a case wherein a wall portion extending in an axis line direction of a coupling hole is present around the coupling hole, there is a case that the wall portion becomes an obstacle so that a grip and a rotating operation of the head portion become difficult. Namely, in order to carry out a coupling operation of the clip, there is a problem that it requires a relatively large spacer around the coupling hole.

The present invention is invented in view of the aforementioned backgrounds, and a main object of the present invention is to reduce a space necessary for an attachment work in the clip coupled to a hole.

Means for Solving the Problems

In order to attain the aforementioned object, the present invention is a clip (1) for coupling a first member (25) wherein an erect portion (35) in which a first through-hole (39) is formed is protruded, and a second member (26) wherein a second through-hole (40) into which the erect portion is inserted to pass through is formed, and the clip (1) is coupled to a coupling hole (43) defined by the first through-hole passing through the second through-hole, and the second member. The clip (1) includes a flexible cylindrical portion (2) having a predetermined center axis line (A), opening both ends, and formed so that a distance from the center axis line to an outside surface is different in a rotational direction around the center axis line. In the cylindrical portion, the center axis line is orthogonal to an axis line of the coupling hole, and the cylindrical portion is inserted into the coupling hole rotatably between a first rotational position and a second rotational position around the center axis line. In the cylindrical portion, a distance between the center axis line and the outside surface is set so that the cylindrical portion is loosely fitted into the coupling hole at the first rotational position, and is clamped between hole walls of the coupling hole at the second rotational position.

According to the structure, the cylindrical portion of the clip is coupled to the coupling hole by rotating around the center axis line disposed to be approximately vertical relative to the axis line of the coupling hole. In a case wherein the clip is rotated around the center axis line disposed to be approximately vertical relative to the axis line of the coupling hole, one portion of the clip is pushed into a coupling hole side from an axis line direction of the coupling hole so as to rotate the clip. Consequently, even in a case wherein only a relatively small space can be ensured around the coupling hole, the clip can be easily coupled to the coupling hole. Also, the clip (1) is formed in a cylindrical shape so as to enhance flexibility into a direction orthogonal to the center axis line. Consequently, when the coupling hole clamps the clip, the clip mainly bends so as to be difficult to apply loads to a member defining the coupling hole. Consequently, the member defining the coupling hole is difficult to deform so as to prevent deterioration (fatigue fracture).

Also, in the aforementioned invention, preferably, the cylindrical portion has a first length (L1) in a first direction orthogonal to the center axis line; a second length (L2) in a second direction orthogonal to the center axis line and having a predetermined angle relative to the first direction; and a third length (L3) in a third direction orthogonal to the center axis line and located between the first direction and the second direction. Also, preferably, when the cylindrical portion is located at the first rotational position, the cylindrical portion faces the hole walls in the first direction; and when the cylindrical portion is located at the second rotational position, the cylindrical portion faces the hole walls in the second direction. Also, preferably, the second length is longer than the first length, and is shorter than the third length.

According to the structure, the clip can be clamped in the coupling hole and coupled to the coupling hole by a rotating operation of the clip. Also, when the clip rotates up to the second rotational position once, the clip is maintained in the second rotational position, and a coupled state between the clip and the coupling hole is stably maintained.

Also, in the aforementioned invention, preferably, in the cylindrical portion, a cross section orthogonal to the center axis line has an approximately parallelogram shape. Also, preferably, the first direction corresponds to a direction wherein a pair of longer sides of the approximately parallelogram shape of the cross section faces each other; the second direction corresponds to a direction wherein a pair of shorter sides of the approximately parallelogram shape of the cross section faces each other; and the third direction corresponds to a direction wherein a pair of opposite angles of the approximately parallelogram shape of the cross section faces each other.

Also, in the aforementioned invention, preferably, corner portions disposed in the third direction of the cylindrical portion are chamfered.

According to the structure, the clip is prevented from being caught on the hole walls of the coupling hole, so that the rotating operation can be easily carried out.

Also, in the aforementioned invention, preferably, the cylindrical portion is formed so that a length in a direction of the center axis line differs as moving in the rotational direction around the center axis line. Also, preferably, in the second rotational position, the cylindrical portion is clamped between the hole walls of the coupling hole in the direction of the center axis line.

According to the structure, in the second rotational position, the clip is clamped in the coupling hole in two orthogonal directions so as to improve stability.

Also, in the invention, preferably, at one end side in the direction of the center axis line, the cylindrical portion includes an abutment portion (75) which can surface-contact with a peripheral edge portion of the second through-hole.

According to the structure, a contact area of the abutment portion between the clip and the second member increases, so that a contact pressure declines, and a plastic deformation of both members is prevented.

Also, in the invention, preferably, the cylindrical portion includes a locking convex portion (13) protruding to the center axis line side and to an outside of the cylindrical portion from an inside surface thereof. Also, preferably, the locking convex portion is received in a portion (44) positioned inside the second through-hole of the first through-hole to be rotatable around the center axis line.

According to the structure, a position of the clip is controlled within a predetermined range by an engagement between the locking convex portion and the portion positioned inside the second through-hole of the first through-hole so as to stabilize a rotation around the center axis line of the clip.

Also, in the invention, a pair of locking convex portions may be provided at rotational symmetric positions around the center axis line of the cylindrical portion.

According to the structure, two locking convex portions positioned at the rotational symmetric positions can engage with the portion positioned inside the second through-hole of the first through-hole so as to stabilize a posture of the clip relative to the coupling hole.

Also, in the invention, preferably, the cylindrical portion includes a protruding piece (5) protruding in a direction of separating from the center axis line, and when the cylindrical portion is located in the second rotational position, the protruding piece abuts against an outer edge of the coupling hole.

According to the structure, the protruding piece and a peripheral edge portion of the coupling hole abut so as to maintain the clip in the second rotational position.

Also, in the invention, the erect portion (35 and 80) may include a pair of side poles (37 and 81) protruding from the first member; a beam (38 and 83) bridging between tips of the pair of side poles; the first through-hole (39 and 84) defined by the pair of side poles, the beam, and the first member; and reinforcement walls (82) bridging between the side poles and the first member.

According to the structure, a rigidity of the erect portion defining the coupling hole is enhanced, and a fatigue fracture of the erect portion when repeatedly attaching and detaching the clip can be restricted. Also, the rigidity is enhanced by the reinforcement walls so as to reduce a thickness of the side poles. The thickness of the side poles is reduced so as to restrain a sink from occurring in a case of molding the erect portion by injection molding.

Effect of the Invention

According to the aforementioned structure, in the clip coupled to the hole, the space necessary for the attachment work can be reduced.

BEST MODES OF CARRYING OUT THE INVENTION

Hereinafter, clips according to embodiments of the present invention will be explained with reference to the drawings. The clip is coupled to a coupling hole formed by combining two members so as to couple the two members.

(First Embodiment)

A clip 1 according to the present embodiment is a resin molded body, and is formed by, for example, polyacetal (POM) which is thermoplastics resin. As shown in FIG. 1 to FIG. 4, the clip 1 includes a cylindrical main body portion 2 having a center axis line A. In the main body portion 2, a cross section orthogonal to the center axis line A has approximately a parallelogram shape. Side portions of the main body portion 2 include a pair of longer side wall portions 3 corresponding to long opposite sides of the parallelogram shape; and shorter side wall portions 4 corresponding to short opposite sides. The pair of longer side wall portions 3 extends mutually in parallel, and a pair of shorter side wall portions 4 extends mutually in parallel. In another embodiment of the main body portion, the longer side wall portions 3 and the shorter side wall portions 4 may be mutually orthogonal to form a rectangular cross section.

Figure 3:
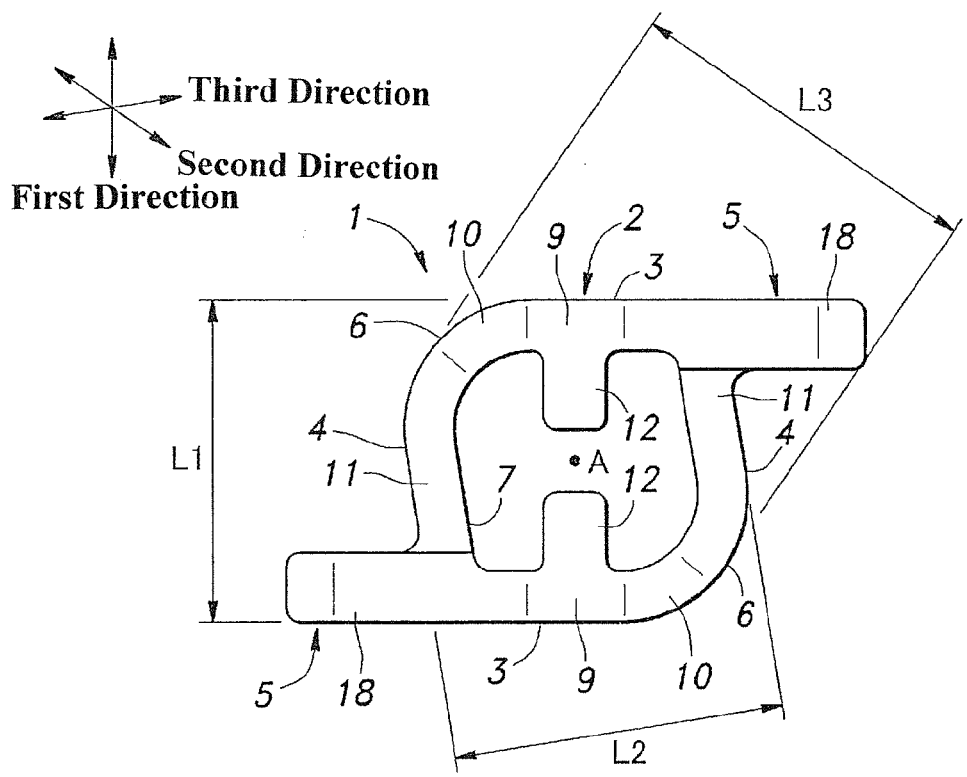
FIG. 3 is a plan view of the clip according to the embodiment.

In boundary portions between the longer side wall portions 3 and the shorter side wall portions 4, there are respectively protruded locking pieces 5 at a pair of boundary portions diagonally positioned. In the boundary portions between the longer side wall portions 3 and the shorter side wall portions 4, the other pair of boundary portions diagonally positioned forms curved surface portions 6 smoothly continuing on side faces of the longer side wall portions 3 and the shorter side wall portions 4. The curved surface portion 6 is formed on a circular-arc curved surface around an axis line parallel to the center axis line A. As shown in FIG. 3, in a case wherein the clip 1 is viewed from above, each locking piece 5 is provided at an end portion on a right-handed rotation (clockwise) side around the center axis line A of the longer side wall portion 3, and each curved surface portion 6 is provided at an end portion on a left-handed rotation (counterclockwise) side around the center axis line A. The main body portion 2 includes an inner hole 7 at a center portion, which passes through in a direction of the center axis line A.

A direction where the pair of longer side wall portions 3 faces each other is a first direction; a direction where the pair of shorter side wall portions 4 faces each other is a second direction; and a direction where the pair of curved surface portions 6 faces each other is a third direction. As shown in FIG. 3, the main body portion 2 has a length L1 (a distance between the pair of longer side wall portions 3) in the first direction; has a length L2 (a distance between the pair of shorter side wall portions 4) in the second direction; and has a length L3 (a distance between the pair of curved surface portions 6) in the third direction. The length L1, the length L2, and the length L3 have a relationship of L1<L2<L3.

A lower edge portion 8 of the main body portion 2 formed by lower edge portions of the longer side wall portion 3 and the shorter side wall portion 4 is disposed on an imaginary surface orthogonal to the center axis line A. On the other hand, an upper edge portion of the longer side wall portion 3 includes a concave groove 9 at a center portion in an extending direction, and there is formed an inclined edge portion 10 elevated upward as moving to both ends from a center. An upper edge portion 11 of the shorter side wall portion 4 extends in the first direction.

On an inner surface of each longer side wall portion 3, there is provided a protruding wall portion 12 protruding to a center axis line A side. Both protruding wall portions 12 are separated from each other by sandwiching the center axis line A. On an inner end (a tip) side on a lower end face of the protruding wall portion 12, there is provided a locking convex portion 13 protruding downward below the lower edge portion 8. A base end portion of the locking convex portion 13 forms an inclined surface 14 projecting in such a way as to advance to an inner surface side of the longer side wall portion 3 as advancing to a base end side (upward).

Figure 1:
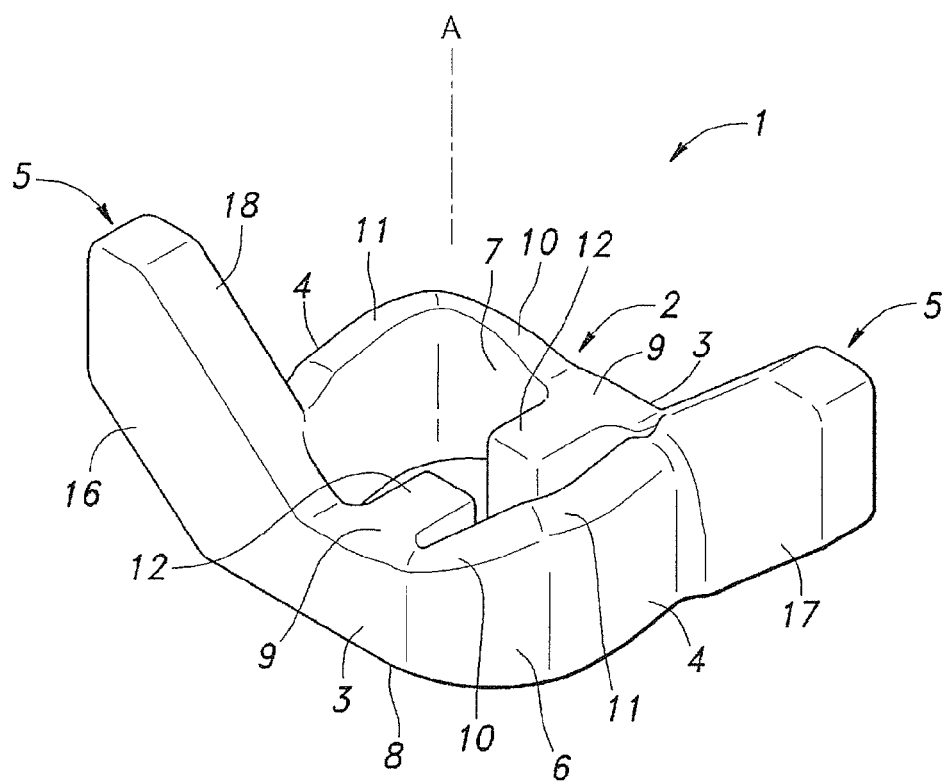
FIG. 1 is an upper perspective view of a clip according to an embodiment.
Figure 2:
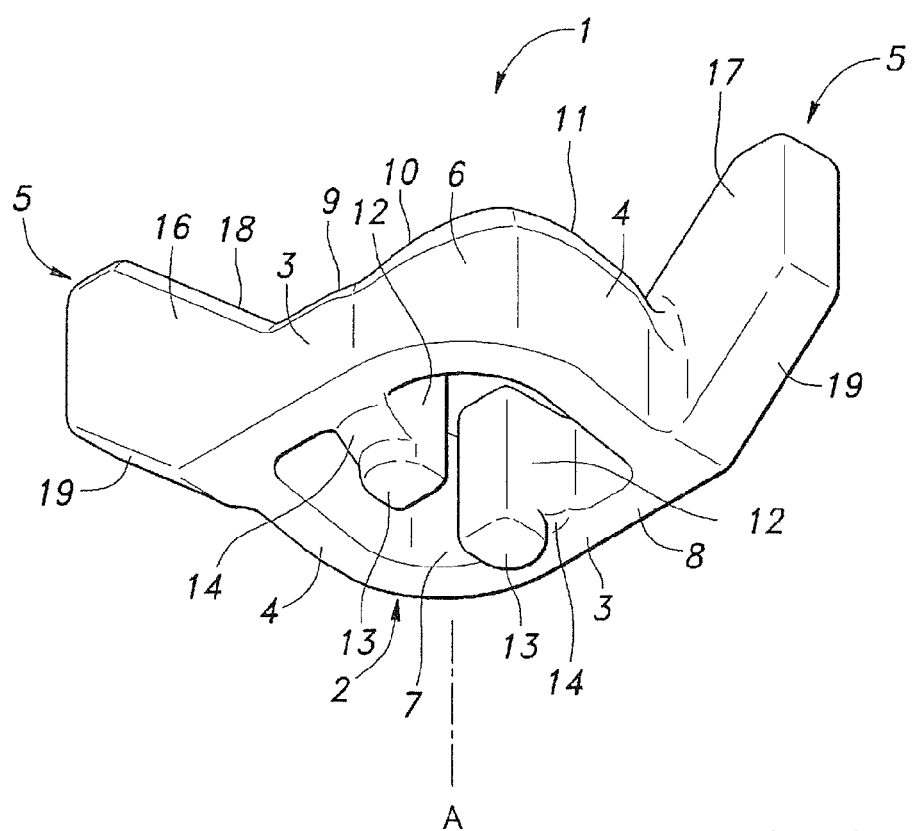
FIG. 2 is a lower perspective view of the clip according to the embodiment.
Figure 4:
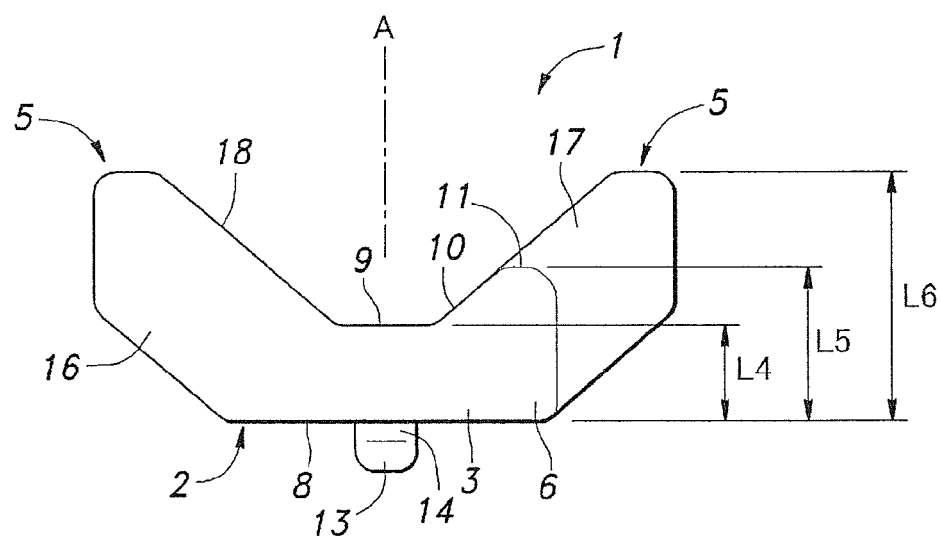
FIG. 4 is a side view of the clip according to the embodiment.

A pair of locking pieces 5 inclines and extends in the second direction and upward from the boundary portions between the longer side wall portions 3 and the shorter side wall portions 4, respectively. Thereby, as shown in FIG. 4, from a view in the first direction, the main body portion 2 and the pair of locking pieces 5 form a V shape together. As shown in FIG. 1, the locking piece 5 includes a first side face 16 continuing to an outer surface of the longer side wall portion as one surface at a portion facing a right-and-left direction; and a second side face 17 provided in parallel with the first side face 16 at a side opposite to the first side face 16, and orthogonal to the shorter side wall portion 4. Also, the locking piece 5 includes an upper side inclined surface 18 smoothly continuing to the inclined edge portion 10; and a lower side inclined surface 19 provided at a side opposite to the upper side inclined surface 18, and extending in parallel with the upper side inclined surface 18 from the lower edge portion 8 to a tip side, between the first side face 16 and the second side face 17.

As shown in FIG. 4, in an up-and-down direction, a length from the lower edge portion 8 to a bottom portion of the concave groove 9 is L4; a length from the lower edge portion 8 to the upper edge portion 11 is L5; and a length from the lower edge portion 8 to a tip of the locking piece 5 is L6. A relationship between the length L4, the length L5, and the length L6 is L4<L5<L6.

The clip 1 formed as above has a 180-degree rotational symmetric shape around the center axis line A.

Figure 5:
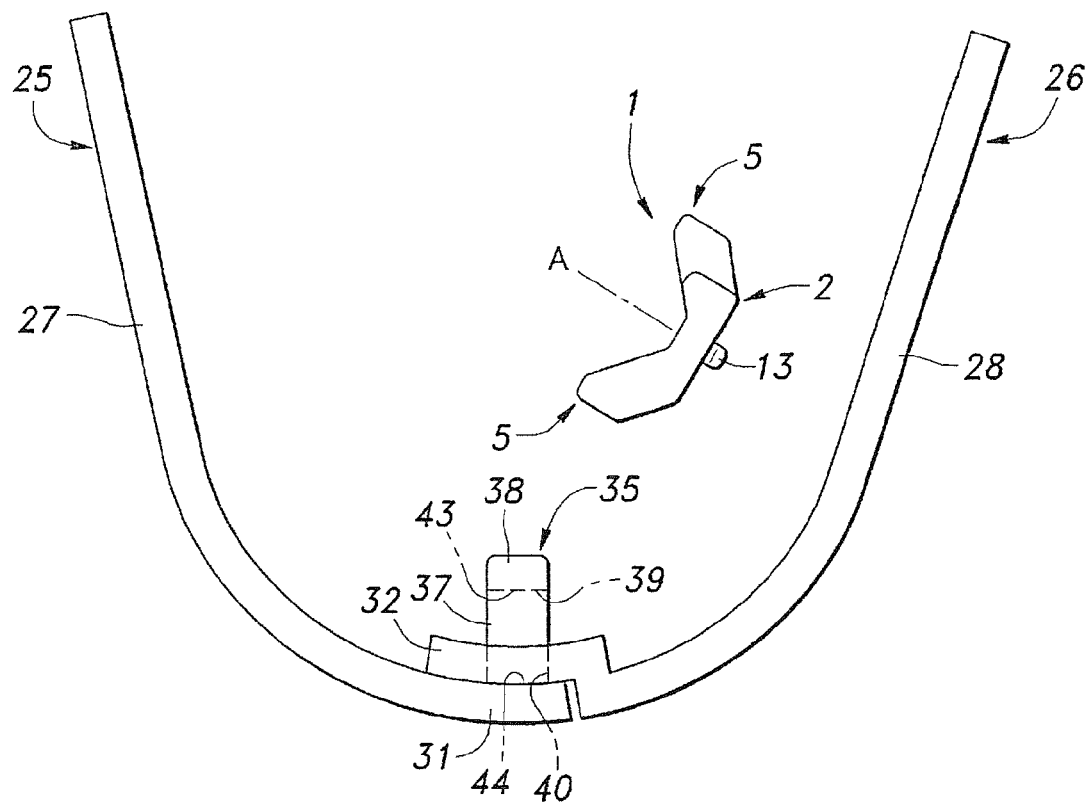
FIG. 5 is a side view of a first cowl and a second cowl fastened by the clip according to the embodiment.
Figure 6:
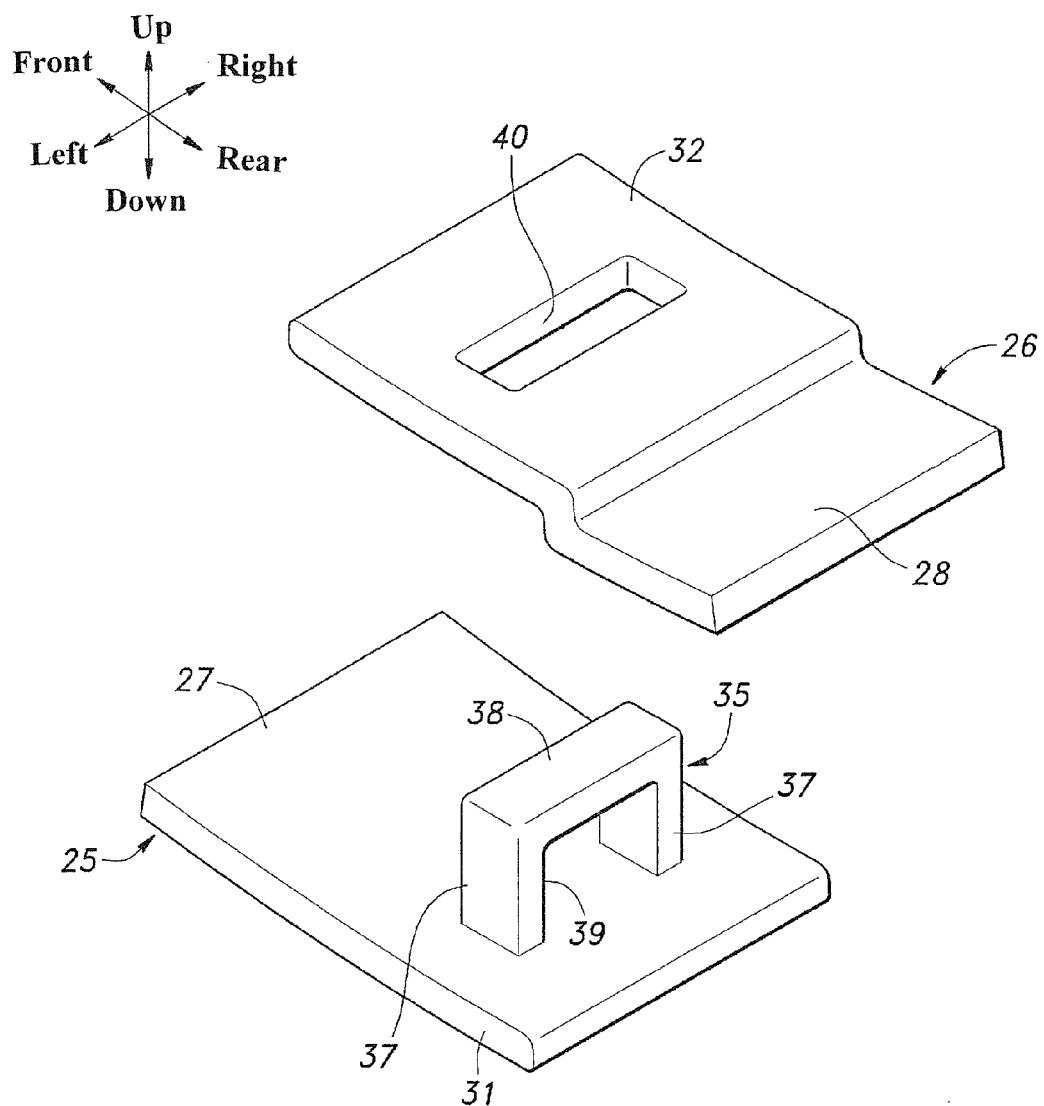
FIG. 6 is an enlarged perspective view showing essential parts of the first cowl and the second cowl.

Next, a usage example of the clip 1 will be explained. As shown in FIG. 5, the clip 1 fastens a first cowl 25 and a second cowl 26. The first cowl 25 and the second cowl 26 are resin molded bodies, and have flexibility. The first cowl 25 and the second cowl 26 may be respectively formed by a material having a different material or color. The first cowl 25 and the second cowl 26 respectively include curved main body portions 27 and 28, and are mutually overlaid at a first side edge portion 31 and a second side edge portion 32 formed at side edges of each of the main body portion 27 and 28. The first cowl 25 and the second cowl 26 are fastened by the clip 1.

The first side edge portion 31 has a curved plate shape, and at a reverse face, there is vertically protruded a striker (an erect portion) 35. The striker 35 includes a pair of side poles 37 separated from each other and vertically standing at the reverse face of the first side edge portion 31; and a beam 38 connecting between tips of the pair of side poles 37. The striker 35 is integrally formed with the first side edge portion 31. The striker 35 forms a first through-hole 39 having a rectangular cross section together with the pair of side poles 37, the beam 38, and the reverse face of the first side edge portion 31.

The second side edge portion 32 has a plate shape, and is provided by deviating with a different step on a reverse face side at a side portion of the main body portion 28. In the second side edge portion 32, there is formed a second through-hole 40 passing thorough in a thickness direction.

Figure 7:
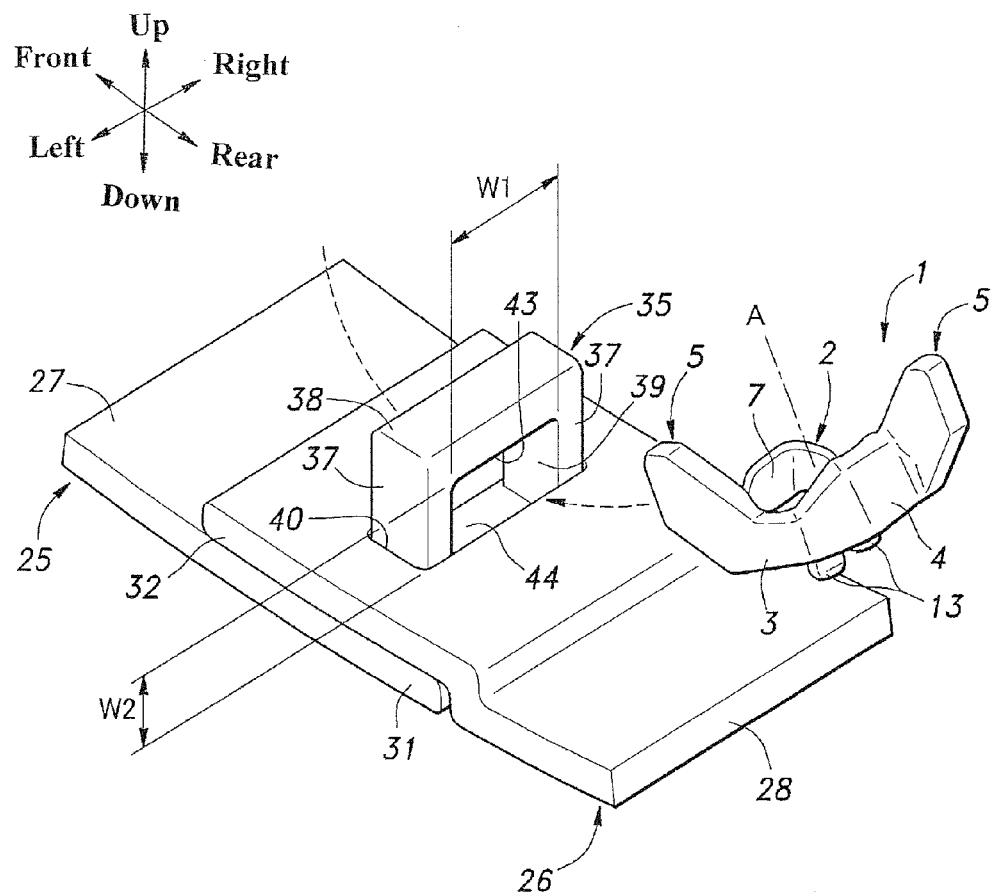
FIG. 7 is a perspective view showing the clip and a coupling hole according to the embodiment.

The second side edge portion 32 is curved with the same curvature as the first side edge portion 31, and a surface thereof can surface-contact with the reverse face of the first side edge portion 31. As shown in FIG. 5 and FIG. 7, the striker 35 passes through the second through-hole 40, and the first side edge portion 31 and the second side edge portion are mutually laminated, so that surfaces of the main body portions 27 and 28 of the first cowl 25 and the second cowl 26 are mutually disposed on one surface.

As shown in FIG. 7, the second through-hole 40 has a long hole having a rectangular cross section, and each side pole 37 fits into both end portions of the long hole. The striker 35 fits into the second through-hole 40, so that the second side edge portion 32 is immovably supported in an extending direction of a face relative to the first side edge portion 31. In that state, a coupling hole 43 is defined by the striker 35 passing through the second through-hole 40. Namely, the coupling hole 43 which is a through-hole is formed together with tip portions of the pair of side poles 37, the beam 38, and a peripheral edge of the second through-hole 40. An axis line of the coupling hole 43 extends approximately parallel to the first side edge portion 31 and the second side edge portion 32.

Also, a locking concave portion 44 which is a bottomed hole continuing to the coupling hole 43 is formed together with base end portions of the pair of side poles 37, hole walls of the second through-hole 40, and the reverse face of the first side edge portion 31. The locking concave portion 44 is formed in hole walls of the coupling hole 43 in such a way that an axis line thereof is orthogonal to the axis line of the coupling hole 43. The coupling hole 43 formed in the above-mentioned manner has a rectangular cross section, and has a first width W1 (a distance between both side poles 37); a second width W2 (a distance between a reverse face of the second side edge portion 32 and a lower face of the beam 38); and a depth (a hole length) D. The coupling hole 43 and the clip 1 are formed to satisfy a relationship expressed by $L1 < W1 \leq L2$, $L4 < L5 < W2 < L6$, and $D < L1 < L2$. Incidentally, it is preferable that W1 is slightly larger than L1, and is slightly smaller than L2.

Figure 8:
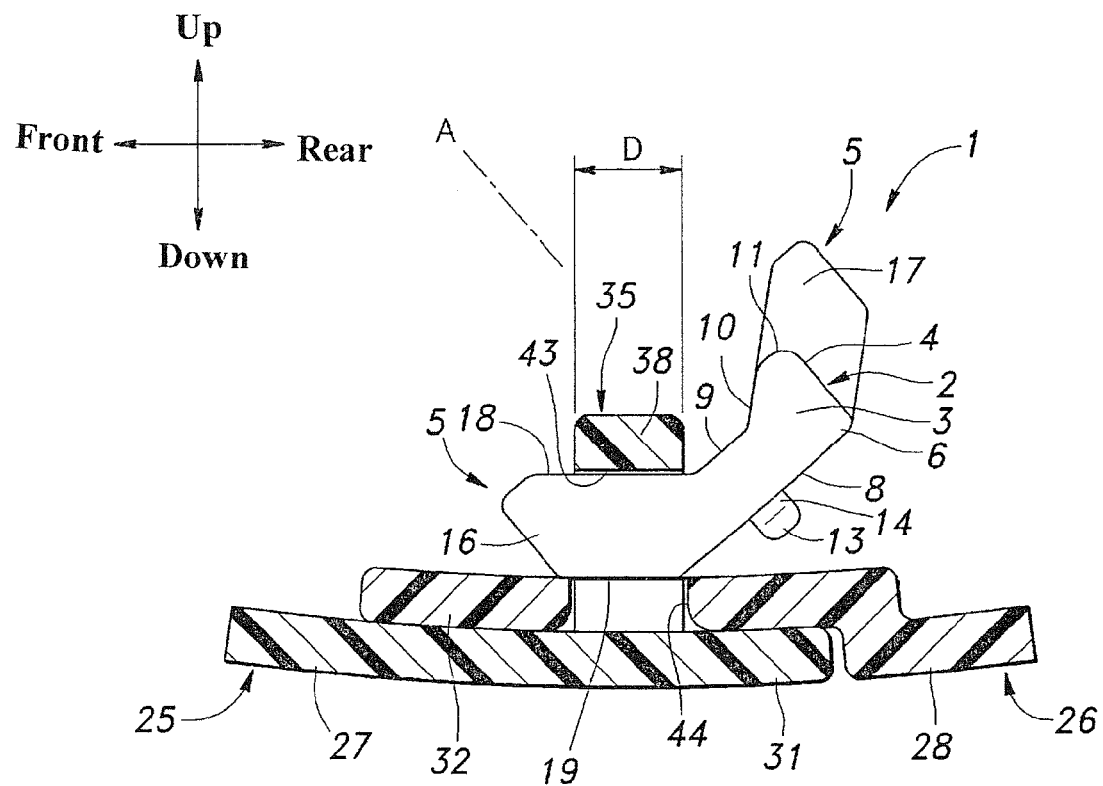
FIG. 8 is a cross-sectional view showing an arrangement when the clip is inserted into the coupling hole according to the embodiment.

In a state wherein the striker 35 is inserted into the second through-hole 40, and the coupling hole 43 is formed by combining the first cowl 25 and the second cowl 26, the clip 1 is inserted into the coupling hole 43, and the clip 1 is coupled to the coupling hole 43. For convenience of explanation, a direction wherein the axis line of the coupling hole 43 extends is called a front-back direction, and a direction wherein both side poles 37 are separated from each other is called a right-and-left direction. As shown in FIG. 7, the clip 1 is disposed in such a way that one of the pair of shorter side wall portions 4 faces the coupling hole 43, and is inserted into the coupling hole 43 from a tip of one locking piece 5. At that time, in the clip 1, a length in the right-and-left direction is L1, and the length L1 is shorter than the first width W1 of the coupling hole 43; however, in the up-and-down direction, the clip 1 has the length L6, and the length L6 is longer than the second width W2 of the coupling hole 43. Consequently, the clip 1 is moved along a circular arc track (see a dashed arrow in FIG. 7) so as to avoid an interference between the locking piece 5 and the hole walls of the coupling hole 43. More specifically, at first, the clip 1 is disposed so that the tip of the locking piece 5 is positively opposed to the coupling hole 43, and an extending direction of the locking piece 5 becomes approximately parallel to the axis line of the coupling hole 43, and as shown in FIG. 8, while inserting the locking piece 5 into the coupling hole 43 from the tip, the clip 1 is rotated relative to the coupling hole 43 in such a way that the tip of the locking piece 5 moves upward on a reverse side of the coupling hole 43. At that time, the concave groove 9 ensures a gap between the main body portion 2 and the hole wall (the beam 38) of the coupling hole 43 to allow an insertion of the clip 1 along the circular arc track.

Figure 9:
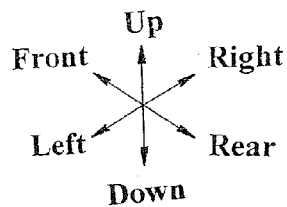
FIG. 9 is a perspective view showing a temporarily attached state of the clip according to the embodiment.
Figure 9:
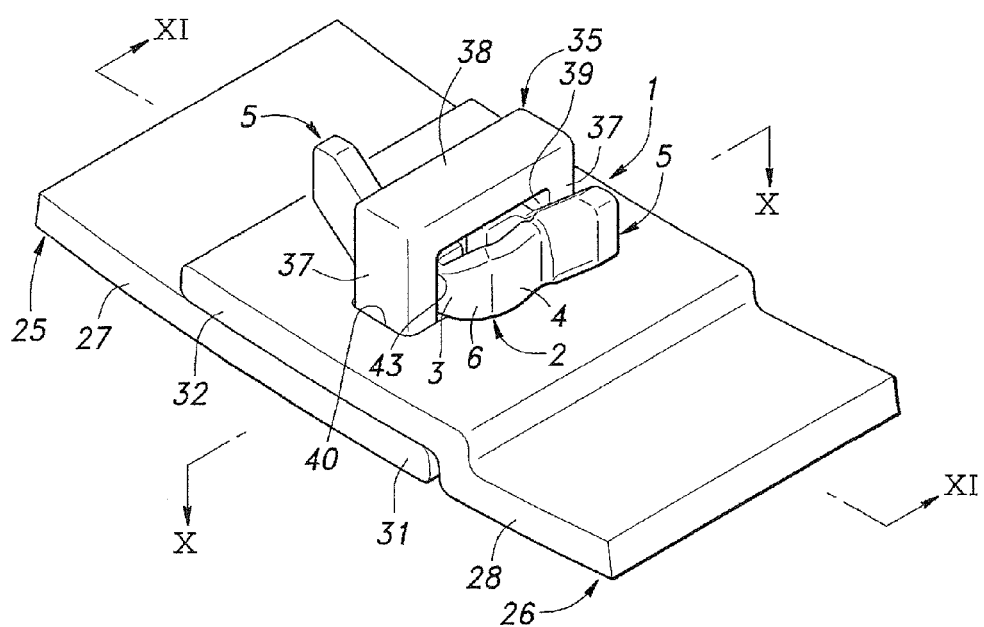
Figure 10:
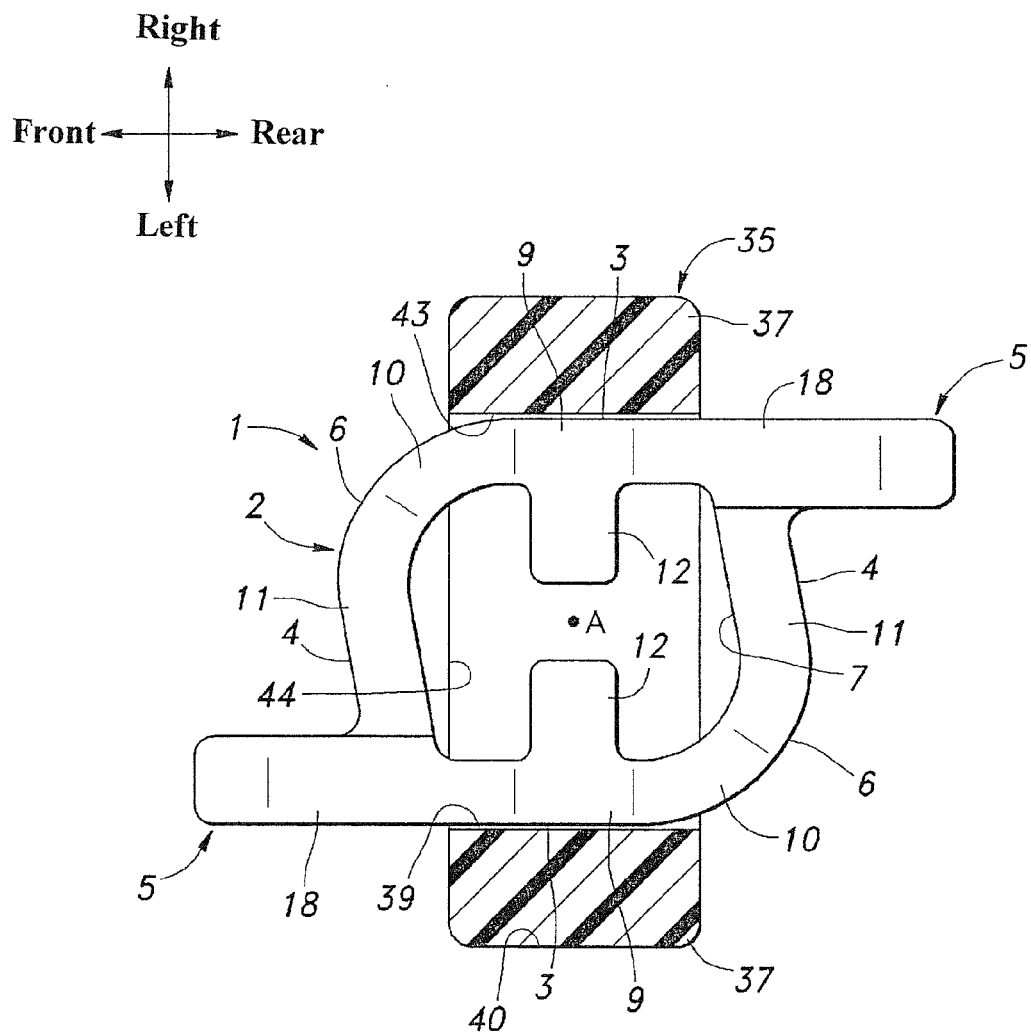
FIG. 10 is a cross-sectional view taken along a line X-X in FIG. 9.
Figure 11:
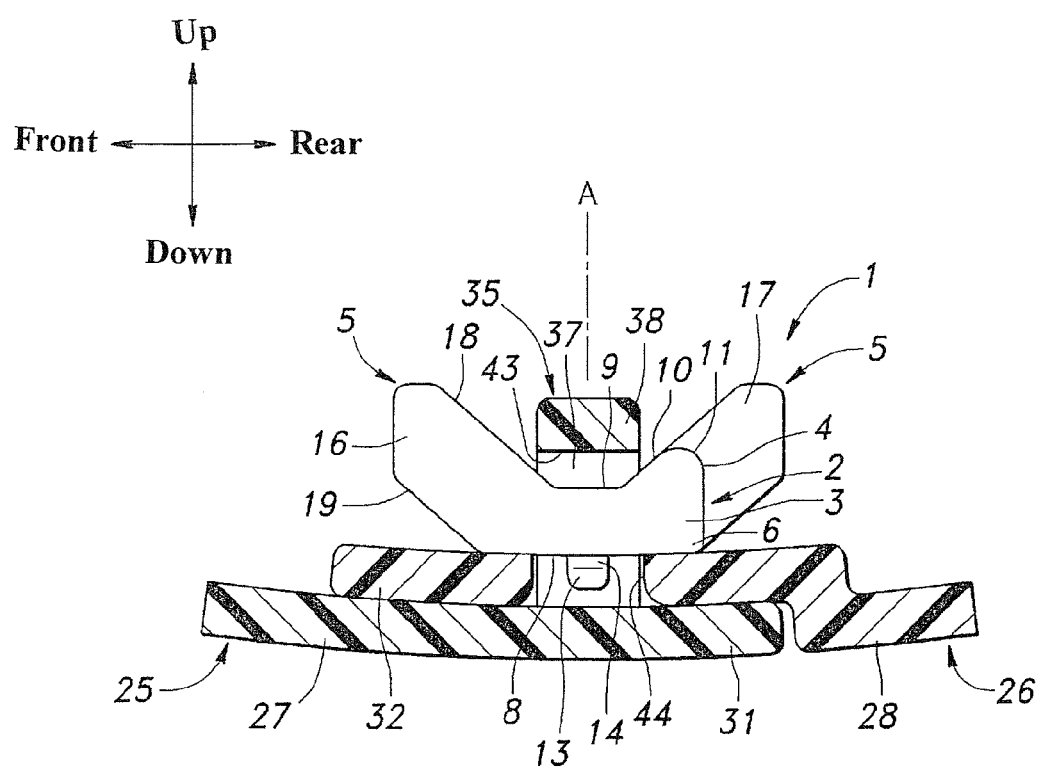
FIG. 11 is a cross-sectional view taken along a line XI-XI in FIG. 9.

As shown in FIG. 9 to FIG. 11, when the insertion of the clip 1 into the coupling hole 43 advances, one locking piece 5 passes through the coupling hole 43, and is disposed in front of the striker 35, and the center portion of the main body portion 2 enters into an inside of the coupling hole 43, and the concave groove 9 and the beam 38 forming one portion of the hole wall of the coupling hole 43 are positively opposed to each other. At that time, a pair of locking convex portions 13 of the clip 1 fits into the locking concave portion 44, and the lower edge portion 8 of a front end portion and a back end portion of the main body portion 2 can surface-contact with an upper face of the second side edge portion 32 disposed in front and back of the locking concave portion 44. This state is called a temporarily attached state. In the temporarily attached state, the center axis line A of the clip 1 extends in the up-and-down direction, and is orthogonal to the axis line of the coupling hole 43. A rotational position of the clip 1 around the center axis line A in the temporality attached state is called a first rotational position. In the first rotational position, a front end and a back end of the main body portion 2 protrude to an outside of the coupling hole 43, and a pair of upper edge portions 11 is disposed in the outside of the coupling hole 43, and is separated from the hole wall (the beam 38) of the coupling hole 43.

In the temporarily attached state, the upper side inclined surface 18 of the pair of locking pieces 5 collides with a peripheral edge portion (the beam 38) of the coupling hole 43, or the locking convex portion 13 collides with a wall face of the locking concave portion 44 so as to control a front-to-back movement relative to the coupling hole 43 of the clip 1 within a predetermined range. Also, both longer side wall portions 3 of the clip 1 collide with the hole walls (both side poles 37) of the coupling hole 43 so as to control a right-to-left movement relative to the coupling hole 43 of the clip 1 within a predetermined range. Also, a wall face of the concave groove 9 collides with the hole wall (the beam 38) of the coupling hole 43, or the lower edge portion 8 collides with the reverse face of the second side edge portion 32 so as to control an up-to-down movement relative to the coupling hole 43 of the clip 1 within a predetermined range. Therefore, the clip 1 is in a state loosely fitted into the coupling hole 43 in the front-back, right-and-left, and up-and-down directions. In the temporarily attached state, in order to disengage the clip 1 from the coupling hole 43, as with an insertion time, it is necessary to move the clip 1 along the circular arc track.

Next, the clip 1 is rotated clockwise (on the basis of a top view) from the first rotational position around the center axis line A. At that time, the locking convex portion 13 abuts against a hole wall of the locking concave portion 44 so as to restrict the front-to-back movement relative to the coupling hole 43 of the clip 1 within the predetermined range. The rotation is carried out up to a position (called a second rotational position) where the second side face 17 of each locking piece 5 collides with both side poles 37 which are the hole walls of the coupling hole 43 so as to be controlled. A state after the rotation is called a coupled state.

Figure 12:
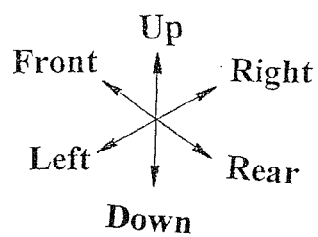
FIG. 12 is a perspective view showing a state during a rotation of the clip according to the embodiment.
Figure 12:
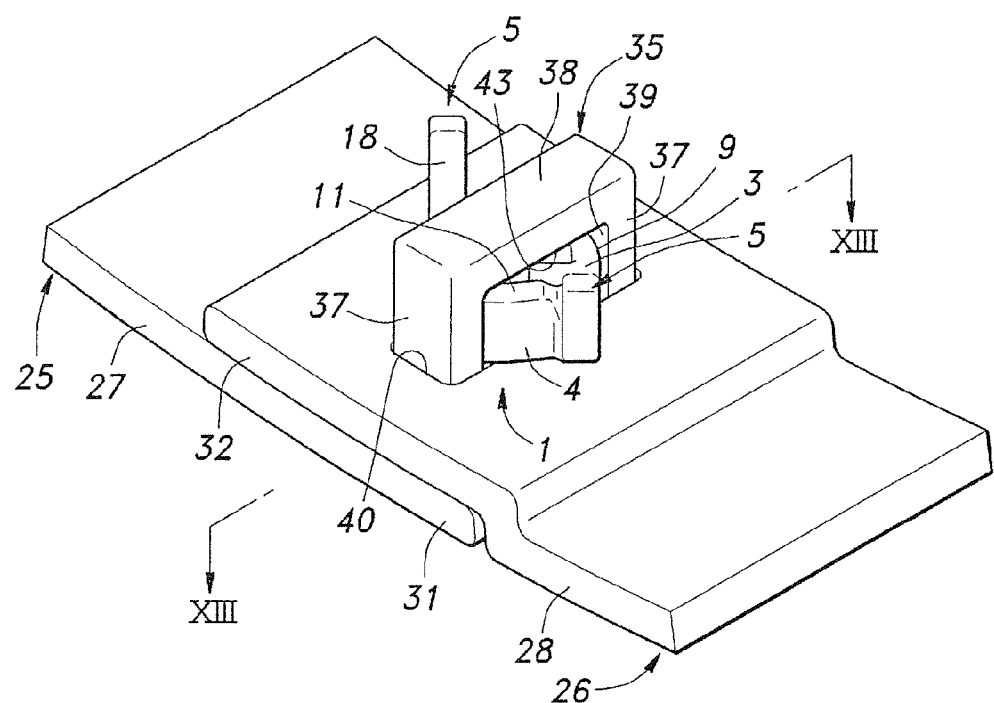
Figure 13:
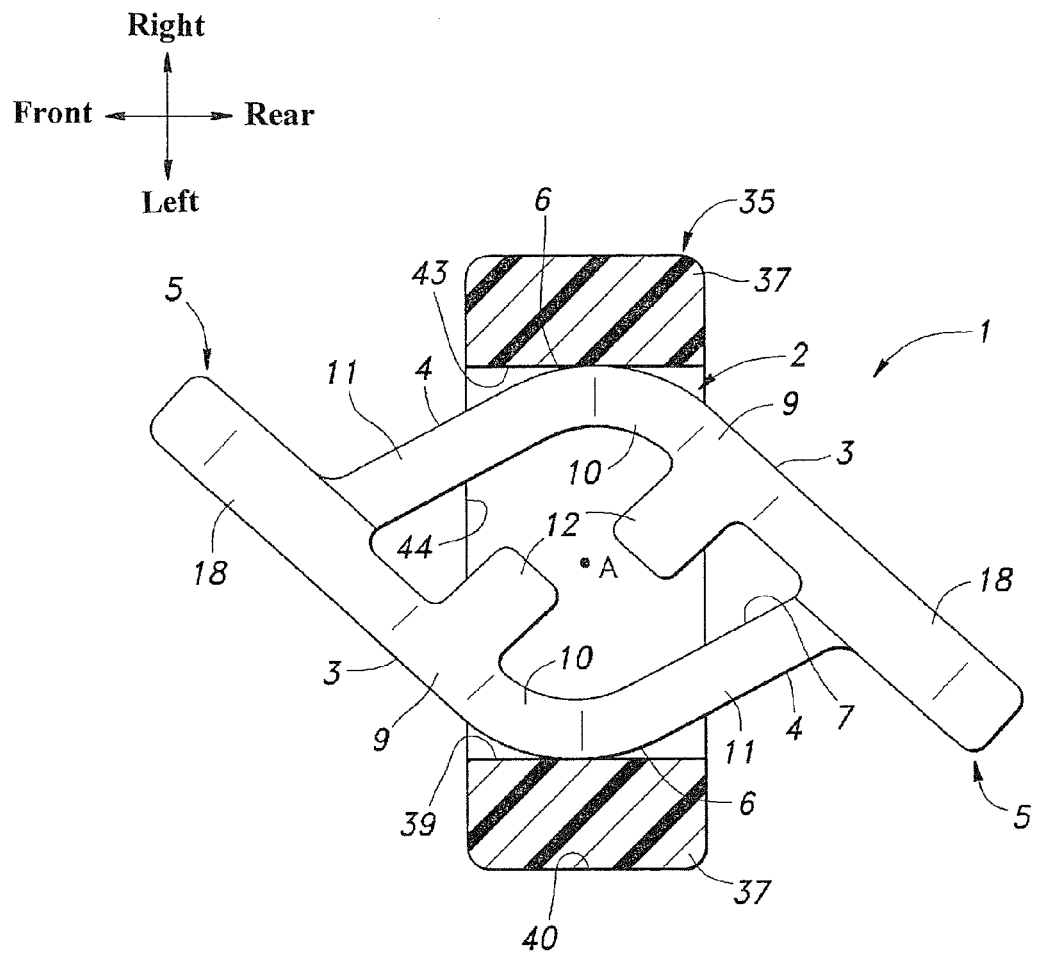
FIG. 13 is a cross-sectional view taken along a line XIII-XIII in FIG. 12.
Figure 14:
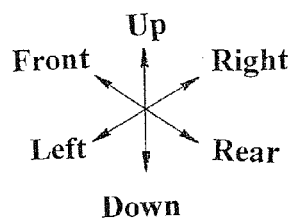
FIG. 14 is a perspective view showing a coupled state of the clip according to the embodiment.
Figure 14:
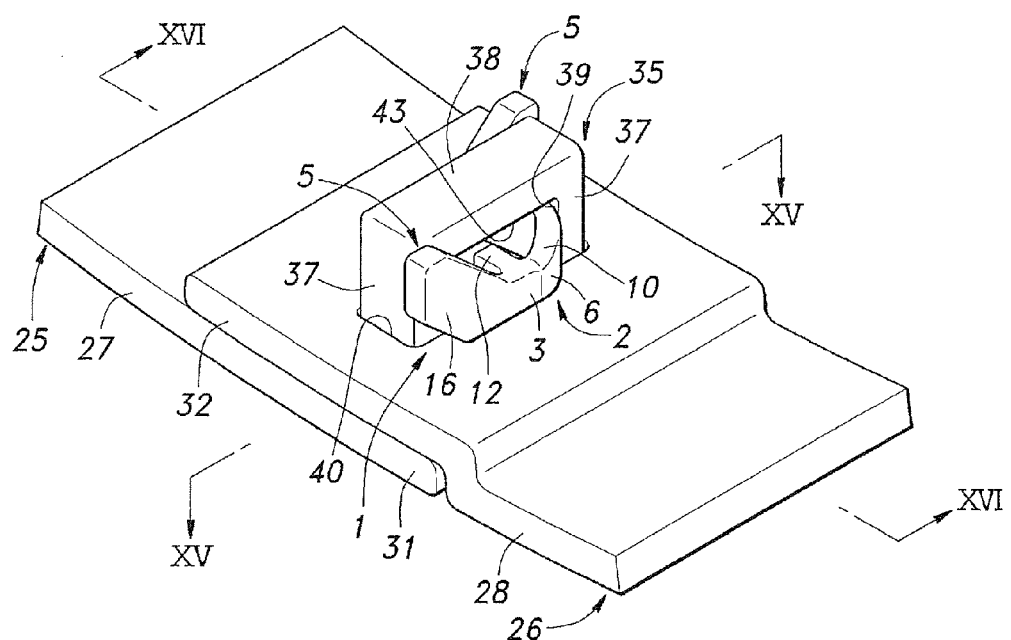

As shown in FIG. 12 and FIG. 13, in a process of rotating from the first rotational position to the second rotational position, the clip 1 comes to a state wherein both curved surface portions 6 are disposed inside the coupling hole 43, i.e., a state wherein the third direction is disposed to become parallel to the right-and-left direction. The clip 1 has the length L3 in the third direction, and the length L3 is longer than the first width W1 of the coupling hole 43. Consequently, during the rotation of the clip 1, it is required that at least one of the clip 1 and the hole walls of the coupling hole 43 elastically deforms. In the present embodiment, the main body portion 2 of the clip 1 is formed in a cylindrical shape having the inner hole 7 so as to enhance flexibility. Consequently, as shown in FIG. 13, during the rotation of the clip 1, mainly the clip 1 deforms around the center axis line A so as to be difficult to apply loads to the side poles 37 forming the hole walls of the coupling hole 43.

Figure 15:
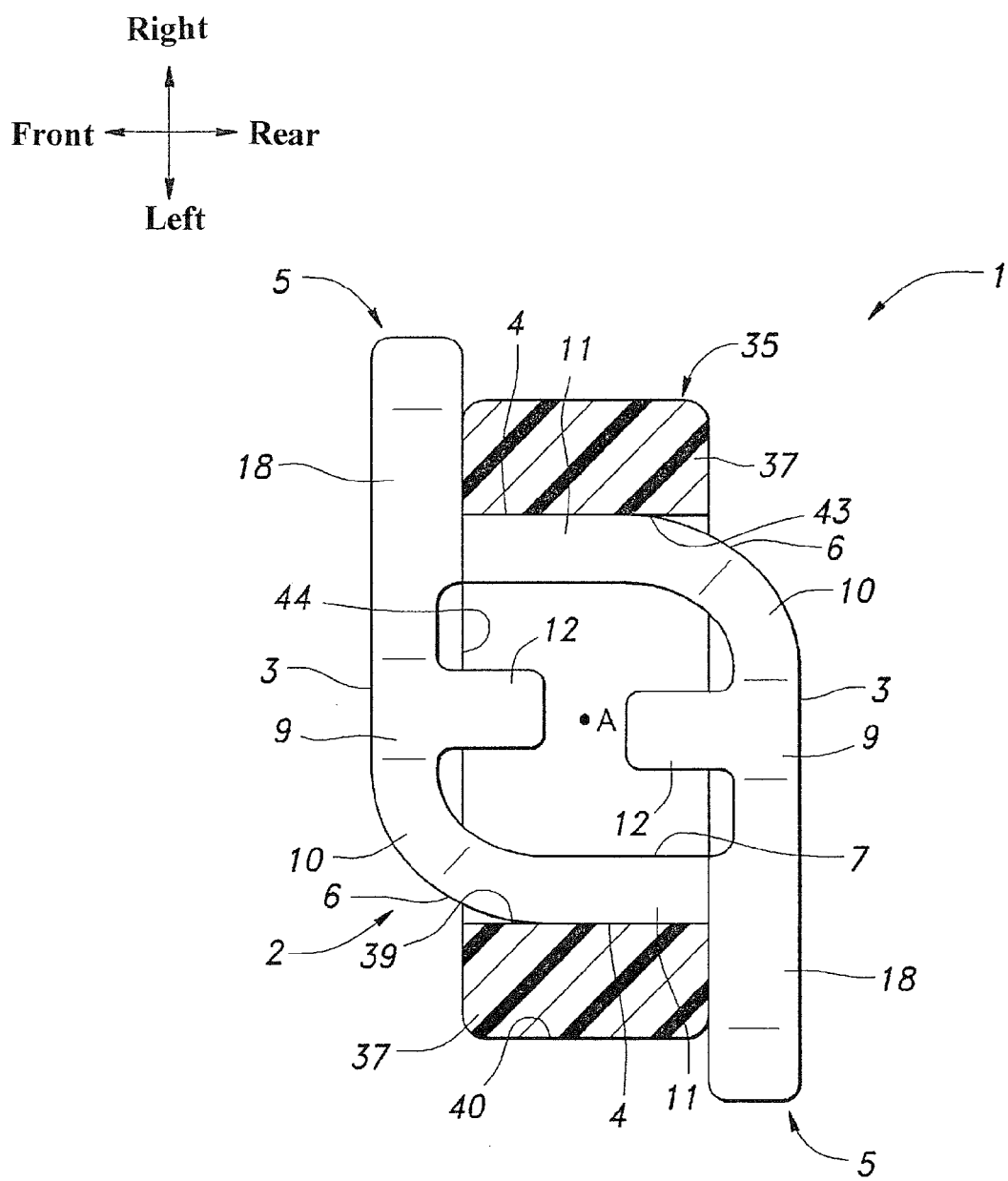
FIG. 15 is a cross-sectional view taken along a line XV-XV in FIG. 14.

As shown in FIG. 14 to FIG. 17, in the second rotational position, the clip 1 comes to a state wherein both shorter side wall portions 4 are disposed inside the coupling hole 43, i.e., a state wherein the second direction is disposed to become parallel to the right-and-left direction. The clip 1 has the length L2 in the second direction, and the length L2 is longer than the first width W1 of the coupling hole 43. Consequently, in the second rotational position, it is required that at least one of the clip 1 and the hole walls of the coupling hole 43 elastically deforms. In the present embodiment, as mentioned above, the flexibility of the main body portion 2 of the clip 1 is enhanced, so that as shown in FIG. 15, mainly the clip 1 deforms around the center axis line A so as to be difficult to apply the loads to the side poles 37 forming the hole walls of the coupling hole 43. Thereby, the pair of shorter side wall portions 4 of the clip 1 abuts against the hole walls of the coupling hole 43, and the clip 1 is clamped in the hole walls of the coupling hole 43 from the right-and-left direction. Thereby, the clip 1 is coupled to the coupling hole 43 without wobbling in the right-and-left direction.

Figure 16:
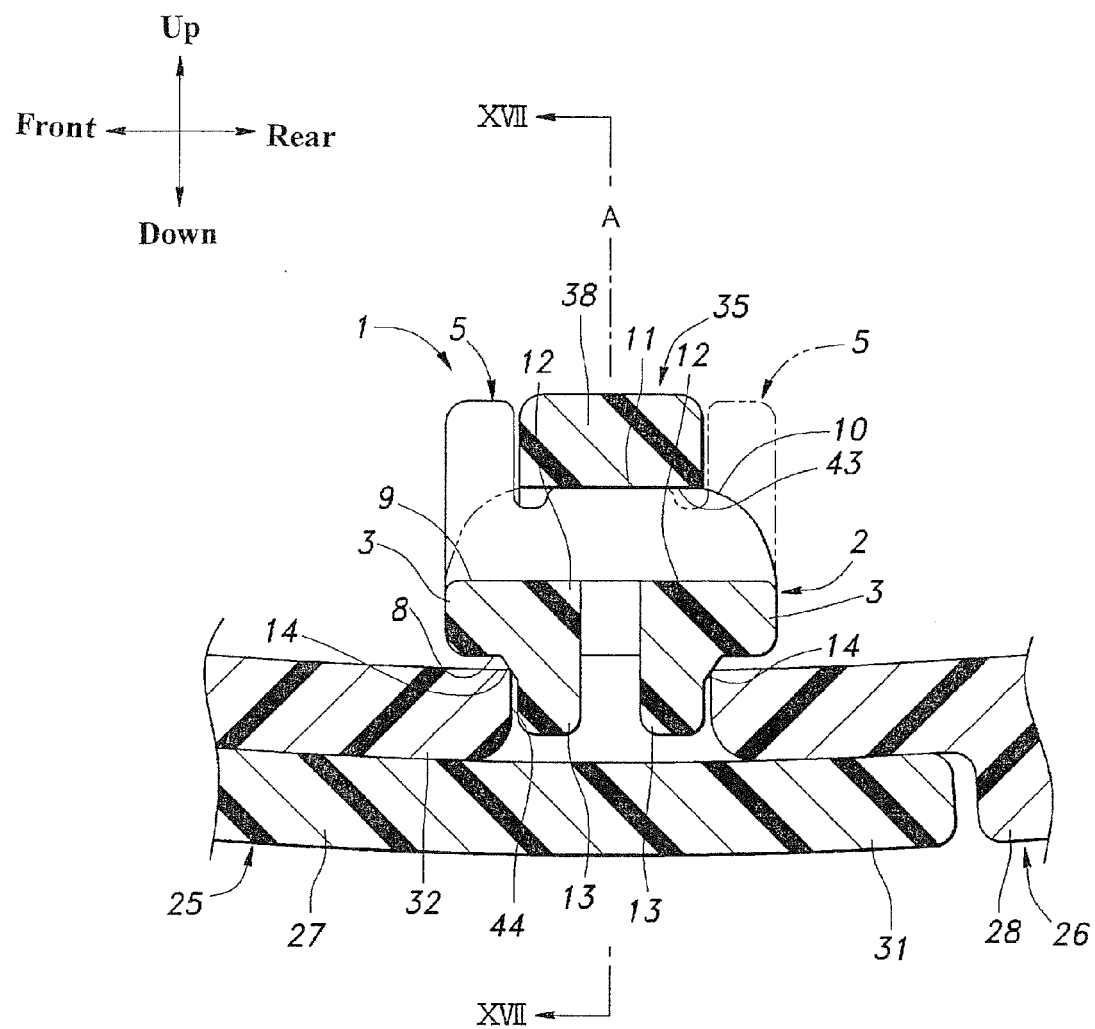
FIG. 16 is a cross-sectional view taken along a line XVI-XVI in FIG. 14.
Figure 17:
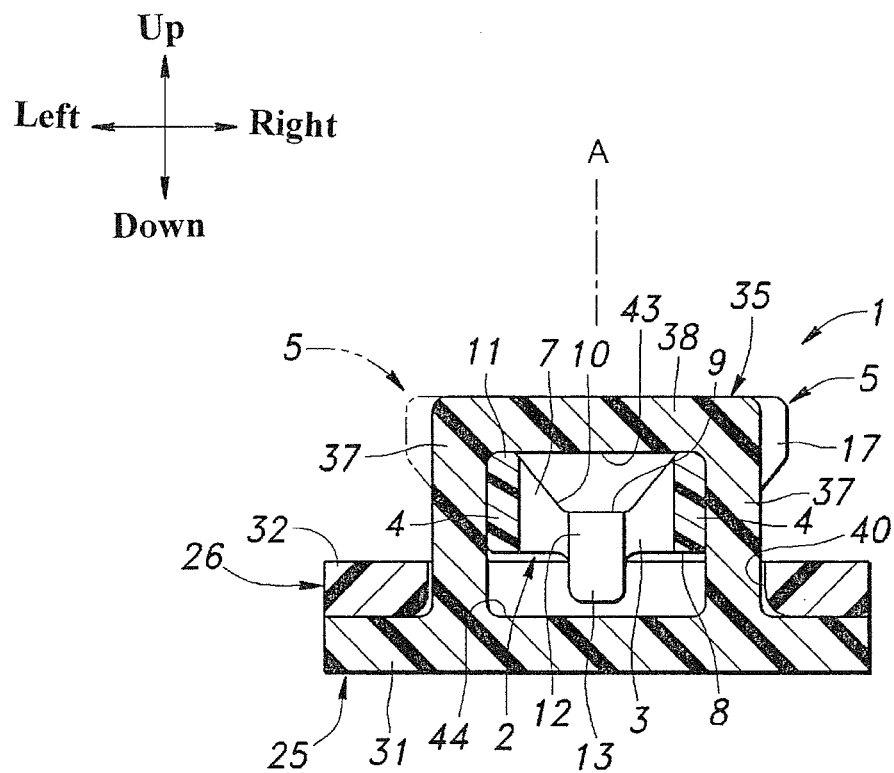
FIG. 17 is a cross-sectional view taken along a line XVII-XVII in FIG. 16.

Also, as shown in FIG. 16, in the second rotational position, the inclined surface 14 of the locking convex portion 13 abuts against a hole edge of the coupling hole 43 (a hole edge of the second through-hole 40). At that time, the upper edge portion 11 of the clip 1 abuts against the hole wall (the beam 38) of the coupling hole 43, and the clip 1 is clamped in the coupling hole 43 from the up-and-down direction (a direction along the center axis line A). Thereby, the clip 1 is coupled to the coupling hole 43 without wobbling in the up-and-down direction.

Also, the clip 1 rotates from the first rotational position to the second rotational position, so that one of the pair of locking pieces 5 is disposed on a front side of the hole edge (the beam 38) of the coupling hole 43, and the other is disposed on a back side of the hole wall (the beam 38) of the coupling hole 43. Thereby, the locking piece 5 collides with the hole wall (the beam 38) of the coupling hole 43 from front and back, so that the clip 1 is controlled from moving in the front-back direction relative to the coupling hole 43. Also, as mentioned above, the clip 1 abuts against the hole wall of the coupling hole 43 at the pair of shorter side wall portions 4 and the upper edge portion 11, so that a friction force applying to the aforementioned abutment portions controls the front-to-back movement of the clip 1 relative to the coupling hole 43. Incidentally, the pair of locking pieces 5 may be formed to simultaneously abut against the hole edge of the coupling hole 43. Also, in the second rotational position, the pair of locking convex portions 13 is clamped in the hole edge of the locking concave portion 44 (the coupling hole 43) from front and back at the respective inclined surfaces 14, so that the front-to-back movement of the clip 1 relative to the coupling hole 43 is controlled as well.

As mentioned above, in the process of rotating from the first rotational position to the second rotational position, the clip 1 comes to a state wherein a pair of curved surface portions 6 is advanced into the coupling hole 43. At that time, the length L3 of the clip 1 which becomes parallel to the right-and-left direction is longer than any of L1 and L2, so that the clip 1 does not voluntarily rotate between the first rotational position and the second rotational position. Namely, the clip 1 rotates when a rotational force with a predetermined value or above is applied. Consequently, the clip 1 is maintained in the second rotational position after the clip 1 comes to the coupled state, and maintains the coupling to the coupling hole 43.

The clip 1 according to the present embodiment can be coupled to the coupling hole 43 by a simple operation of inserting the clip 1 into the coupling hole 43, and rotating the clip 1 around the center axis line A which becomes approximately vertical relative to the axis line of the coupling hole 43. A rotating operation of the clip 1 can be carried out only by pushing one part (for example, the locking piece 5) of the clip 1 to a side pole 37 side of the striker 35 so as to reduce a working space required for the rotating operation. In the present embodiment, the clip 1 is coupled to the coupling hole 43 formed by combining the first cowl 25 and the second cowl 26 so as to maintain the first cowl 25 and the second cowl 26 to be inseparable, i.e., in a mutually coupled state. The clip 1 has a simple structure and can be coupled to the coupling hole 43 which is the through-hole so as to have a high versatility. Also, the clip 1 rotates from the second rotational position to the first rotational position by an operation using a hand and fingers, and the clip 1 can be easily disengaged from the coupling hole 43 by the front-to-back movement along the circular arc track similar to that at the insertion time so as to be suitable for reusing.

The clip 1 according to the present embodiment forms the inner hole 7 passing through along the center axis line A in the main body portion 2, and the main body portion 2 is formed in the cylindrical shape so as to enhance the flexibility. Consequently, in a case wherein the clip 1 abuts against the hole walls of the coupling hole 43 by the rotation, mainly the main body portion 2 bends so as to be difficult to apply loads to the coupling hole 43. Thereby, even in a case wherein the clip 1 is attached to the coupling hole 43 and removed from the coupling hole 43 with a plurality of times, a deformation and an expansion and contraction of a member (the striker 35) defining the coupling hole 43 are restricted so as to prevent a deterioration (a fatigue fracture).

Next, with reference to FIG. 18 and FIG. 19, a modified embodiment wherein one part of the aforementioned embodiment is modified will be explained. A clip 70 according to the modified embodiment is different from the clip 1 according to the first embodiment in that shapes of a protruding wall portion 72 (12) and a locking convex portion 73 (13) are different; and that the clip 70 includes an abutment portion 75. Other structures of the clip 70 are the same as those of the clip 1. In the clip 70 according to the modified embodiment, the same symbols are assigned to the same structures of the clip 1 according to the first embodiment, and their explanations are omitted.

Figure 18:
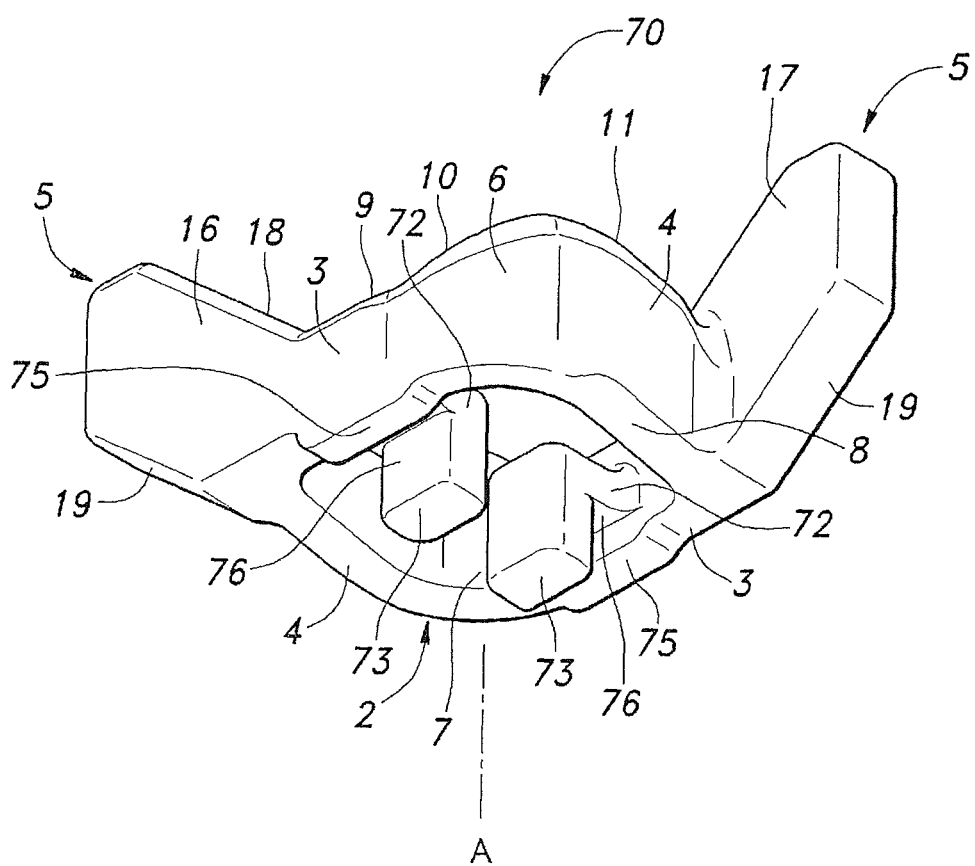
FIG. 18 is a lower perspective view of the clip according to the embodiment.
Figure 19:
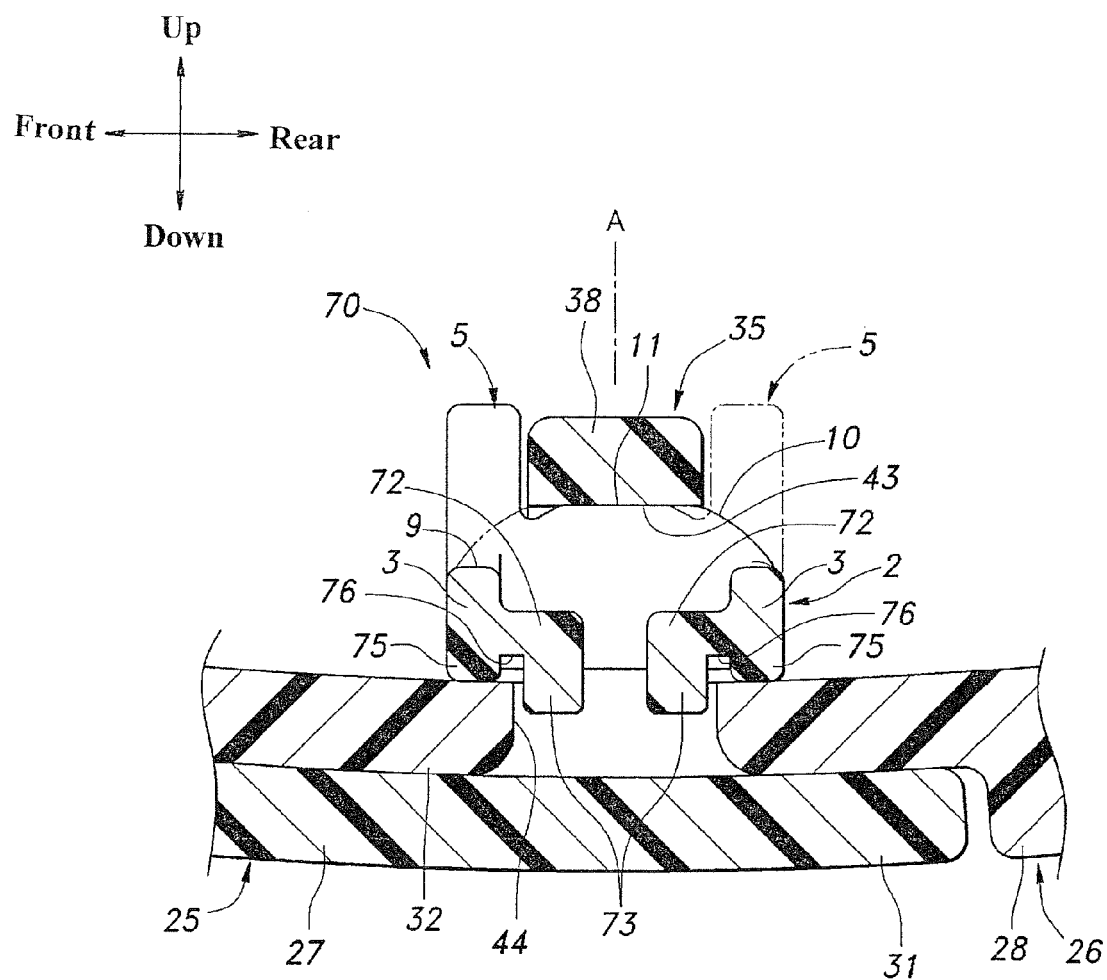
FIG. 19 is a cross-sectional view showing a coupled state of the clip according to a modified embodiment.

As shown in FIG. 18, a pair of protruding wall portions 73 of the clip 70 protrudes to the center axis line A side respectively from the inner surfaces of the longer side wall portions 3 of the main body portion 2, and from portions separated from the lower edge portion 8 of the main body portion 2. Both protruding wall portions 72 are separated from each other by sandwiching the center axis line A. At a tip portion of each protruding wall portion 72, there is respectively provided the locking convex portion 73 protruding downward below the lower edge portion 8 along the direction of the center axis line A. The locking convex portion 73 is separated from the longer side wall portion 3 and extends in the second direction, and a portion facing the inner surface of the longer side wall portion 3 is formed in a flat surface shape.

In the lower edge portion 8 of each longer side wall portion 3, there are respectively provided the abutment portions 75 protruding in parallel with the center axis line A. Each abutment portion 75 extends along the longer side wall portion 3, and a lower end face (a protruding end face) thereof is a face parallel to an imaginary surface orthogonal to the center axis line A. The lower end face of the abutment portion 75 is disposed above a tip of the locking convex portion 73.

A groove-like depression 76 opening downward and having a lower face of the protruding wall portion 72 as a bottom portion, is defined together with the abutment portion 75, a lower portion of the longer side wall portion 3, the protruding wall portion 72, and the locking convex portion 73.

The clip 70 formed as mentioned above is inserted into the coupling hole 43 as with the clip 1 to come to the temporarily attached state. At that time, a pair of locking convex portions 73 fits into the locking concave portion 44 as with the locking convex portions 13 of the clip 1, and collides with the wall face of the locking concave portion 44 so as to control the front-to-back movement relative to the coupling hole 43 of the clip 1 within the predetermined range.

The clip 70 rotates around the center axis line A from the temporarily attached state as with the clip 1 to come to the coupled state. As shown in FIG. 19, in the coupled state, the clip 70 surface-contacts with the reverse face of the second side edge portion 32 forming a peripheral edge portion of the locking concave portion 44 (the second through-hole 40) at a pair of abutment portions 75, and the pair of upper edge portions 11 of the main body portion 2 abuts against the hole wall (the lower face of the beam 38) of the coupling hole 43. Thereby, the clip 70 is clamped in the coupling hole 43 in the up-and-down direction (the direction along the center axis line A). At that time, in the up-and-down direction, the depression 76 faces a hole edge in an opening end of the locking concave portion 44 (the second through-hole 40), and the protruding wall portion 72 and the locking convex portion 73 do not contact with an upper face of the hole edge of the locking concave portion 44. Thereby, the hole edge of the locking concave portion 44 can maintain a shape of a corner portion without a plastic deformation. Also, the clip 70 surface-contacts with the reverse face of the second side edge portion at the abutment portion 75, so that a contact pressure applied to the clip 70 and the reverse face of the second side edge portion 32 declines, and the plastic deformation is difficult to occur in each member.

In the coupled state, the locking convex portions 73 are located inside the locking concave portion 44, and collide with the wall face of the locking concave portion 44 so as to control the front-to-back movement relative to the coupling hole 43 of the clip 1 within the predetermined range. Incidentally, both locking convex portions 73 may be disposed in a position simultaneously contactable with the hole wall of the locking concave portion 44 in the front-back direction.

In the coupled state, the clip 70 is clamped in the hole wall of the coupling hole 43 in the right-and-left direction as with the clip 1, and the locking pieces 5 are disposed in front and back opening end peripheral edges of the coupling hole 43, and a position of the clip 70 is maintained relative to the coupling hole 43.

A specific embodiment has been explained in the above; however, the present invention is not limited to the aforementioned embodiments, and can be widely modified. For example, in the aforementioned embodiments, an example of the coupling hole having the rectangular shape in the cross section has been explained; however, the shape of the cross section may be another shape such as a polygon, an oval shape, a circle, and the like. In that case, the shape of the main body portion of the clip may be determined by conforming to the shape of the coupling hole. Also, in the present embodiment, a shape of a cross section orthogonal to the center axis line A of the main body portion 2 has an approximately rectangle (a shape wherein the longer side wall portion 3 and the shorter side wall portion 4 are orthogonal); however, the shape of the cross section of the main body portion 2 may be a parallelogram shape, an oval shape, or the like provided that it has a shape satisfying a relationship expressed by L2>L1.

Figure 20:
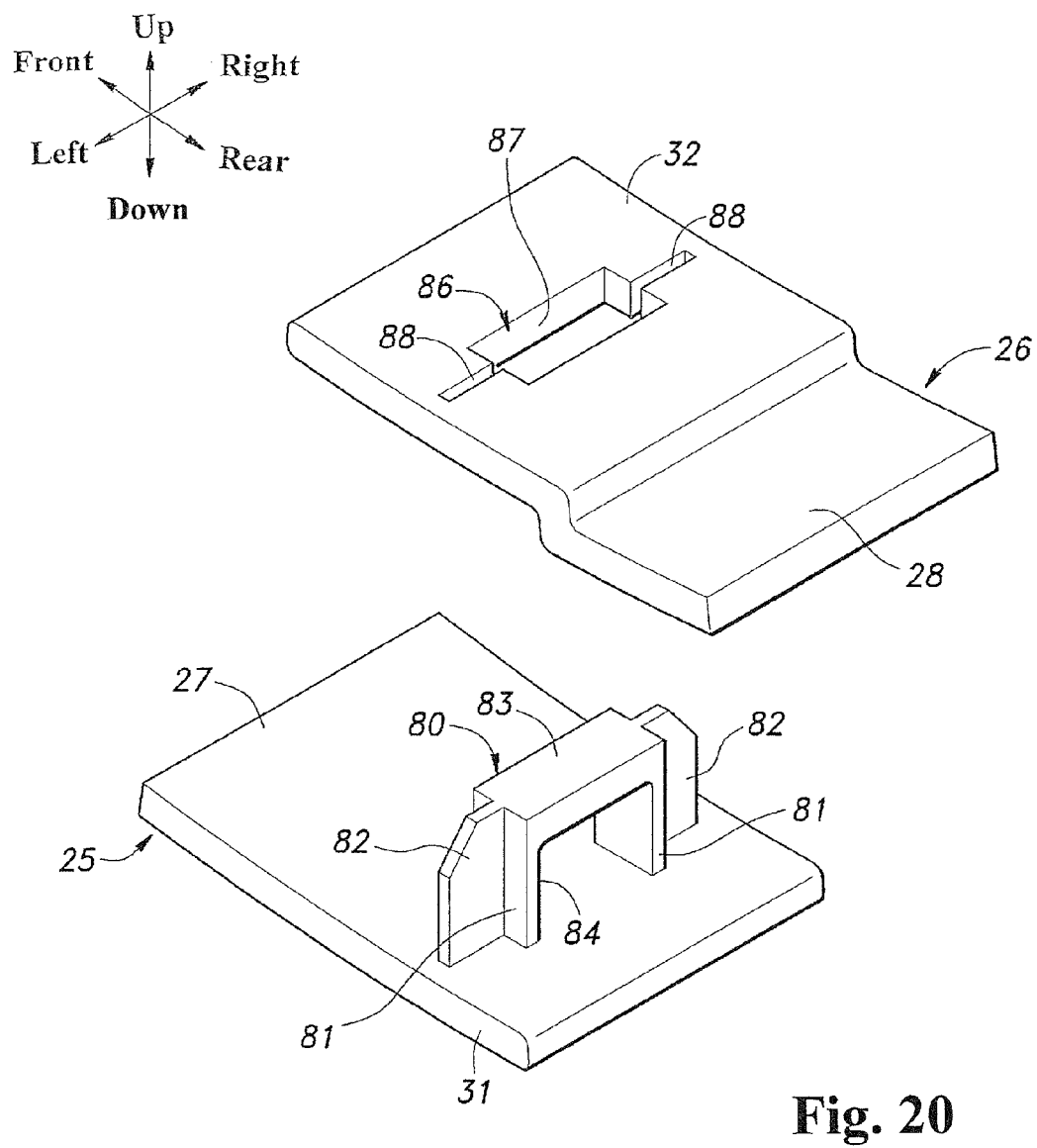
FIG. 20 is an enlarged perspective view showing the essential parts of the first cowl and the second cowl according to the modified embodiment.

Also, the shapes of the striker 35 and the second through-hole 40 defining the coupling hole 43 may be appropriately modified. For example, as shown in FIG. 20, a width of a right-and-left pair of side poles 81 forming a striker 80 may be narrowed in the right-and-left direction, and be widened in the front-back direction so as to reduce a horizontal cross section. In that case, on mutually facing side faces of the pair of side poles 81, there may be provided reinforcement walls (ribs) 82 protruding to right and left. The reinforcement walls 82 are plate-like bodies, include main surfaces facing front and back, and are disposed at an intermediate portion in a front-back direction of the side poles 81. At an edge portion, the reinforcement wall 82 continues to the reverse face of the first side edge portion 31 and an outer surface of the side pole 81. Between tips of the pair of side poles 81, there is bridged a beam 83 extending in the right-and-left direction, and a first through-hole 84 is defined together with the pair of side poles 81, the beam 83, and the first side edge portion 31. The second through-hole 86 formed in the second side edge portion 32 includes a main hole 87 having a rectangular cross section wherein the pair of side poles 81 and the beam 83 can pass through; and a pair of auxiliary holes 88 extending in the right-and-left direction from both right and left side portions of the main hole 87, and allowing the pair of reinforcement walls 82 to pass through. Thus, the reinforcement walls 82 are provided in the side poles 81 so as to enhance a rigidity of the striker 80. Also, the rigidity of the striker 80 is enhanced, so that a thickness of the side pole 81 can be reduced, and a sink is restrained from being produced in a case of producing by injection molding.

Also, the aforementioned reinforcement walls 82 may be provided in a position continuing to a front end edge or a back end edge of the mutually facing side faces of the pair of side poles 81. In that case, the main surface of the reinforcement wall 82 forms a surface continuing to a front side face or a back side face of each side pole 81. One reinforcement wall 82 may be disposed at a front end edge of the side pole 81, and the other reinforcement wall 82 may be disposed at a back end edge of the side pole 81. In the coupled state of the clip 1, the reinforcement wall 82 is located at a position covering the second side face 17 of the locking piece 5, so that an access of a hand and fingers into the second side face 17 of the locking piece 5 becomes difficult. Thereby, an unnecessary disconnection of the clip 1 by a user can be prevented.

EXPLANATION OF SYMBOLS

1 . . . a clip, 2 . . . a main body portion, 3 . . . a longer side wall portion, 4 . . . a shorter side wall portion, 5 . . . a locking piece, 6 . . . a curved surface portion, 7 . . . an inner hole, 8 . . . a lower edge portion, 9 . . . a concave groove, 10 . . . an inclined edge portion, 11 . . . an upper edge portion, 12 . . . a protruding wall portion, 13 . . . a locking convex portion, 14 . . . an inclined surface, 25 . . . a first cowl, 26 . . . a second cowl, 31 . . . a first side edge portion, 32 . . . a second side edge portion, 35 . . . a striker (an erect portion), 37 . . . a side pole, 38 . . . a beam, 39 . . . a first through-hole, 40 . . . a second through-hole, 43 . . . a coupling hole, 44 . . . a locking concave portion, 70 . . . a clip, 72 . . . a protruding wall portion, 73 . . . a locking convex portion, 75 . . . an abutment portion, 76 . . . a depression, 82 . . . a reinforcement wall

What is claimed is:

1. A clip for coupling a first member where an erect portion in which a first through-hole is formed is protruded, and a second member where a second through-hole into which the erect portion is inserted to pass through is formed, and coupling a coupling hole defined by the first through-hole passing through the second through-hole and the second member, comprising:
    a flexible cylindrical portion having a predetermined center axis line, opening two ends, and formed so that a distance from the center axis line to an outside surface is different in a rotational direction around the center axis line,
    wherein the cylindrical portion has the center axis line orthogonal to an axis line of the coupling hole, and is inserted into the coupling hole rotatably between a first rotational position and a second rotational position around the center axis line, and
    the cylindrical portion is set to have a distance between the center axis line and the outside surface in such a way as to be loosely fitted in the coupling hole at the first rotational position and to be clamped between hole walls of the coupling hole at the second rotational position.

2. A clip according to claim 1, wherein the cylindrical portion has a first length in a first direction orthogonal to the center axis line; has a second length in a second direction orthogonal to the center axis line and having a predetermined angle relative to the first direction; and has a third length in a third direction orthogonal to the center axis line and located between the first direction and the second direction,
    when the cylindrical portion is located at the first rotational position, the cylindrical portion faces the hole wall in the first direction,
    when the cylindrical portion is located at the second rotational position, the cylindrical portion faces the hole wall in the second direction, and
    the second length is longer than the first length, and shorter than the third length.

3. A clip according to claim 2, wherein the cylindrical portion forms a cross section orthogonal to the center axis line in an approximately parallelogram shape,
    the first direction corresponds to a direction wherein a pair of longer sides of the approximately parallelogram shape of the cross section faces each other,
    the second direction corresponds to a direction wherein a pair of shorter sides of the approximately parallelogram shape of the cross section faces each other, and
    the third direction corresponds to a direction wherein a pair of opposite angles of the approximately parallelogram shape of the cross section faces each other.

4. A clip according to claim 3, wherein corner portions of the cylindrical portion disposed in the third direction are chamfered.

5. A clip according to claim 1, wherein the cylindrical portion is formed so that a length in a direction of the center axis line differs as moving in a rotational direction around the center axis line, and
    at the second rotational position, the cylindrical portion is clamped between the hole walls of the coupling hole in the direction of the center axis line.

6. A clip according to claim 5, wherein the cylindrical portion includes an abutment portion which can surface-contact with a peripheral edge portion of the second through-hole at one end side in a direction of the center axis line.

7. A clip according to claim 1, wherein the cylindrical portion includes a locking convex portion protruding to a center axis line side and to an outside of the cylindrical portion from an inside surface thereof, and
    the locking convex portion is received in a portion positioned inside the second through-hole of the first through-hole to be rotatable around the center axis line.

8. A clip according to claim 7, wherein the locking convex portion is provided in a pair at rotational symmetric positions around the center axis line of the cylindrical portion.

9. A clip according to claim 1, wherein the cylindrical portion includes a protruding piece protruding in a direction of separating from the center axis line, and
    when the cylindrical portion is located at the second rotational position, the protruding piece abuts against an outer edge of the coupling hole.

10. A clip according to claim 1, wherein the erect portion includes a pair of side poles protruding from the first member; a beam bridging between tips of the pair of side poles; the first through-hole defined by the pair of side poles, the beam, and the first member; and reinforcement walls bridging between the side poles and the first member.

* * * * *